United States Patent [19]
Hunt, Jr. et al.

[11] Patent Number: 6,007,741
[45] Date of Patent: Dec. 28, 1999

[54] METHOD OF MAKING LUMINESCENT METABORATES

[75] Inventors: Roger B. Hunt, Jr., Medfield, Mass.; Michael A. Krebs, Montezuma, N.Mex.

[73] Assignee: Osram Sylvania Inc., Danvers, Mass.

[21] Appl. No.: 09/136,671

[22] Filed: Aug. 19, 1998

[51] Int. Cl.[6] .......................... C09K 11/36; C09K 11/78; C09K 11/55

[52] U.S. Cl. ..................................... 252/301.4 R

[58] Field of Search ...................... 252/301.4 R

[56] References Cited

U.S. PATENT DOCUMENTS

| 4,319,161 | 3/1982 | Looye et al. .............................. 313/486 |
| 5,776,368 | 7/1998 | Chau ................................. 252/301.4 R |

Primary Examiner—C. Melissa Koslow
Attorney, Agent, or Firm—Robert F. Clark

[57] ABSTRACT

A method is provided whereby high brightness metaborate phosphors are made by milling the reactants in a saturated aqueous solution of magnesia and boric acid prior to firing. The method increases the homogeneity of the fired metaborate phosphor cake and reduces the tendency of the fired cake to stick to the firing boats.

6 Claims, 1 Drawing Sheet

METHOD OF MAKING LUMINESCENT METABORATES

TECHNICAL FIELD

This invention relates to luminescent metaborates. More particularly, this invention relates to methods of making luminescent metaborates containing a gadolinium activator.

BACKGROUND ART

Luminescent metaborates are described in U.S. Pat. No. 4,319,161 which is incorporated herein by reference. Of particular interest is the gadolinium line emitter, $Gd_yY_{1-x-y}Ce_xMgB_5O_{10}$, wherein $0.01 \leq x \leq 1-y$ and $0.02 \leq y \leq 0.08$ which emits in 310–315 nm range. This phosphor may be used in combination with a low pressure mercury discharge for irradiation purposes such as the photo-therapy of skin diseases like psoriasis. The conventional preparation of luminescent metaborates involves dry mixing the reactants and then subjecting the mixture to multiple firings. However, the fired cakes produced accordingly tend to be inhomogeneous and stick to the firing boats resulting in lower brightness material.

SUMMARY OF THE INVENTION

It is an object of the invention to obviate the disadvantages of the prior art.

It is another object of the invention to provide a method which increases the homogeneity of the fired metaborate phosphor cake and decreases the tendency of the fired cake to stick to the firing boats.

It is a further object of the invention to provide a method which generates a high brightness metaborate phosphor.

In accordance with one aspect the invention, there is provided a method of making a luminescent metaborate comprising:

milling a mixture of reactants intended to form the luminescent metaborate in a liquid comprising a saturated aqueous solution of magnesia and boric acid;

removing the liquid from the milled mixture; and firing the milled mixture at a temperature and for a time sufficient to form the luminescent metaborate.

DESCRIPTION OF THE PREFERRED EMBODIMENTS

Figure 1:
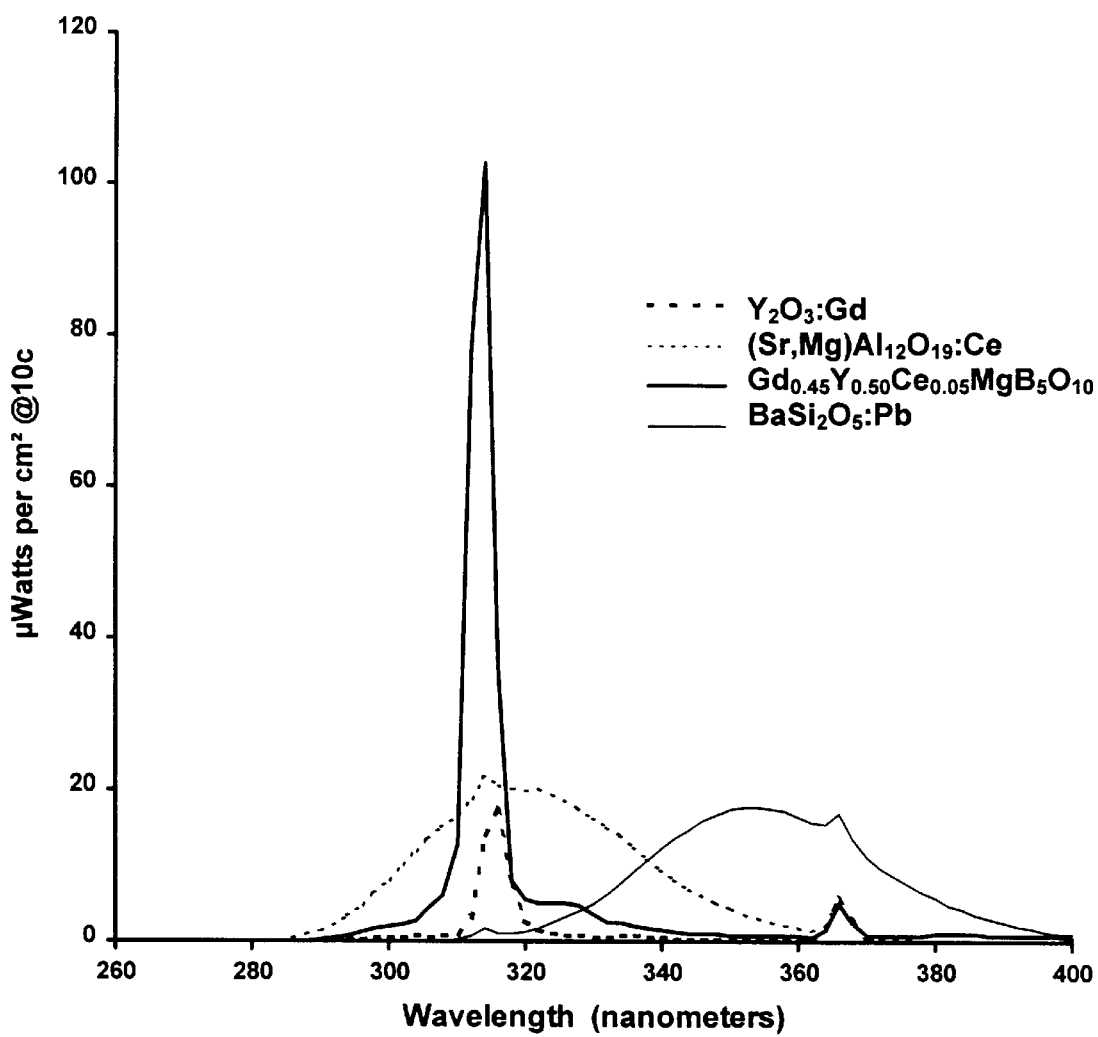
FIG. 1 is compares the ultraviolet (UV) output of a phosphor made by the method of this invention with other UV emitting phosphors.

For a better understanding of the present invention, together with other and further objects, advantages and capabilities thereof, reference is made to the following disclosure and appended claims taken in conjunction with the drawing.

In the method of this invention, luminescent metaborates are prepared by forming a mixture of the reactants intended to form the luminescent metaborate, milling the mixture with a saturated aqueous solution of magnesia (MgO) and boric acid ($H_3BO_3$), and firing the milled mixture at a temperature and for a time sufficient to form the luminescent metaborate. The wet milling step acts to reduce the reactant particle size and enhance mixing. The method provides for greater homogeneity within the fired cakes and reduces the tendency of the fired cake to stick to the firing boats.

The following non-limiting examples are presented.

EXAMPLES

Yttrium gadolinium borate phosphors were formulated according to the general formula, $Gd_yY_{1-x-y}Ce_xMgB_5O_{10}$, wherein $0.01 \leq x \leq 1-y$ and $0.02 \leq y \leq 0.80$. The amounts of the reactants are given in Table 1.

TABLE 1

| Reactant | Grams |
| --- | --- |
| $Gd_2O_3$ | 163.3 |
| $Y_2O_3$ | 112.9 |
| $CeO_2$ | 17.2 |
| MgO | 82.2 |
| $H_3BO_3$ | 741.7 |

The reactants were weighed and added to a four liter ball mill which was half-filled with quarter-inch cylindrical alumina mill media. Two liters of a saturated aqueous solution of boric acid and magnesia was added to the mill to complete the charge. The reactants were milled for one hour, suction filtered and dried at about 120° C. for four hours. The filter cake was then fired three times, each time for three hours, at 1040° C. in a slightly reducing atmosphere of 4% $H_2$ and 96% $N_2$. The fired cake was cooled and pulverized after each firing operation. The final material was then mill-washed in hot deionized water, then rinsed with deionized water, dried and screened to –400 mesh.

Table 2 compares relative plaque brightness and the ultraviolet (UVB) output from low pressure mercury discharge lamps made with the yttrium gadolinium borate phosphors (Y,Gd borate) with a standard UV emitting phosphor $Y_2O_3$:Gd (SYLVANIA Type 2650). The data show that the phosphors made by the method of this invention significantly increase the UV output of the lamps.

TABLE 2

| Sample | Rel. Plaque Brightness | FSSS ($\mu$m) | F40T12 Lamp output Irradiance ($\mu$W/cm$^2$ UVB @10 cm) |
| --- | --- | --- | --- |
| Type 2650 | 5 | — | 97 |
| Y,Gd borate (1) | 100 | 4.00 | 394 |
| Y,Gd borate (2) | 94.0 | 3.20 | 493 |

FIG. 1 compares the UV output of a phosphor made by the method of this invention, $Gd_{0.45}Y_{0.50}Ce_{0.05}MgB_5O_{10}$, with three other UV emitting phosphors. The exceptional UV output at about 315 nm of the $Gd_{0.45}Y_{0.50}Ce_{0.05}MgB_5O_{10}$ phosphor is evident.

While there has been shown and described what are at the present considered the preferred embodiments of the invention, it will be obvious to those skilled in the art that various changes and modifications may be made therein without departing from the scope of the invention as defined by the appended claims.

We claim:

1. A method of making a luminescent metaborate comprising:

milling a mixture of reactants intended to form the luminescent metaborate in a liquid comprising a saturated aqueous solution of magnesia and boric acid;

removing the liquid from the milled mixture; and firing the milled mixture at a temperature and for a time sufficient to form the luminescent metaborate.

2. The method of claim 1 wherein the milled material is subjected to three firings.

3. The method of claim 1 wherein the milled material is fired three times in a slightly reducing atmosphere at 1040° C. for 3 hours each firing.

4. The method of claim 3 wherein the luminescent metaborate is formulated to have a general formula $Gd_y Y_{1-x-y} Ce_x MgB_5 O_{10}$, wherein $0.01 \leq x \leq 1-y$ and $0.02 \leq y \leq 0.08$.

5. A method for making a luminescent metaborate having a general formula $Gd_y Y_{1-x-y} Ce_x MgB_5 O_{10}$, wherein $0.01 \leq x \leq 1-y$ and $0.02 \leq y \leq 0.08$ comprising:

milling a mixture of reactants intended to form the luminescent metaborate in a liquid comprising a saturated aqueous solution of magnesia and boric acid, the reactants comprising gadolinium oxide, yttrium oxide, cerium oxide, magnesium oxide and boric acid;

filtering the milled mixture to remove the liquid;

drying the milled mixture; and firing the milled mixture in a slightly reducing atmosphere at a temperature and for a time sufficient to form the luminescent metaborate.

6. The method of claim 5 wherein the firing of the milled mixture comprises three separate firings at 1040° C. for 3 hours each.

* * * * *